(12) United States Patent
Gilbert et al.

(10) Patent No.: US 11,037,597 B1
(45) Date of Patent: Jun. 15, 2021

(54) HEAT-ASSISTED MAGNETIC RECORDING APPARATUS THAT MODULATES LASER POWER TO REDUCE DIFFERENCES BETWEEN TRACK WIDTHS OF RECORDED MARKS

(71) Applicant: Seagate Technology LLC, Fremont, CA (US)

(72) Inventors: Ian James Gilbert, Chanhassen, MN (US); Peng Peng, Eden Prairie, MN (US); Tim Rausch, Farmington, MN (US); Jan-Ulrich Thiele, Sunnyvale, CA (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 16/915,391

(22) Filed: Jun. 29, 2020

(51) Int. Cl.
| | |
|---|---|
| *G11B 11/105* | (2006.01) |
| *G11B 20/10* | (2006.01) |
| *G11B 20/18* | (2006.01) |
| *G11B 5/73* | (2006.01) |
| *G11B 5/00* | (2006.01) |
| *G11B 7/1267* | (2012.01) |
| *G11B 7/126* | (2012.01) |
| *G11B 7/1263* | (2012.01) |

(52) U.S. Cl.
CPC ...... *G11B 20/10222* (2013.01); *G11B 5/7366* (2019.05); *G11B 20/1816* (2013.01); *G11B 20/1879* (2013.01); *G11B 7/126* (2013.01); *G11B 7/1263* (2013.01); *G11B 7/1267* (2013.01); *G11B 2005/001* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 8,295,010 B2 * | 10/2012 | Shimazawa | G11B 5/02 360/125.31 |
| 8,315,128 B1 | 11/2012 | Wilson et al. | |
| 8,765,273 B1 | 7/2014 | Kubota et al. | |
| 8,824,249 B2 * | 9/2014 | Erden | G11B 5/02 369/13.26 |
| 8,891,341 B1 | 11/2014 | Krichevsky et al. | |
| 9,025,420 B1 | 5/2015 | Ito et al. | |
| 9,093,085 B1 * | 7/2015 | Isokawa | G11B 5/02 |
| 9,478,248 B2 * | 10/2016 | Cordle | G11B 5/02 |

(Continued)

OTHER PUBLICATIONS

Gilbert et al., "Measuring Thermal Gradient in HAMR Using Pseudorandom Bit Sequences", IEEE Transactions on Magnetics, vol. 55, Issue 3, Mar. 2019.

(Continued)

*Primary Examiner* — Tan X Dinh
(74) *Attorney, Agent, or Firm* — Mueting Raasch Group

(57) ABSTRACT

Two or more different elapsed time values are determined between transitions of a data signal applied to a magnetic write transducer of a heat-assisted magnetic recording apparatus. Two or more different power values of the laser are respectively associated with the two or more different elapsed time values. The two or more different power levels are selected to reduce differences between track widths of recorded marks having the two or more different elapsed time values.

20 Claims, 9 Drawing Sheets

(56) References Cited

U.S. PATENT DOCUMENTS

| | | | |
|---|---|---|---|
| 9,502,065 B1 | 11/2016 | Chang et al. | |
| 9,620,163 B1 * | 4/2017 | Zheng | G11B 5/012 |
| 9,679,599 B1 * | 6/2017 | Feist | G11B 5/607 |
| 9,754,610 B2 * | 9/2017 | Wilson | G11B 5/09 |
| 9,761,268 B1 * | 9/2017 | Trantham | G11B 20/14 |
| 9,779,763 B1 * | 10/2017 | Lammers | G11B 5/02 |
| 9,842,621 B1 * | 12/2017 | Mader | G11B 20/10009 |
| 9,892,752 B1 * | 2/2018 | Chu | G11B 5/012 |
| 10,056,108 B1 * | 8/2018 | Seng | G11B 5/09 |
| 10,339,963 B1 | 7/2019 | Mader et al. | |
| 2008/0094744 A1 * | 4/2008 | Inomata | G01R 33/1207 |
| | | | 360/55 |

OTHER PUBLICATIONS

Richter et al.; "Direct Measurement of Thermal Gradient in Heat Assisted Magnetic Recording", IEEE Transactions on Magnetics, vol. 49, Issue 10, Oct. 2013.

Saunders et al., "HAMR Thermal Gradient Measurements and Analysis", IEEE Transactions on Magnetics, vol. 53, Issue 2, Feb. 2017.

* cited by examiner

HEAT-ASSISTED MAGNETIC RECORDING APPARATUS THAT MODULATES LASER POWER TO REDUCE DIFFERENCES BETWEEN TRACK WIDTHS OF RECORDED MARKS

SUMMARY

The present disclosure is directed to modulating a laser power signal during heat-assisted magnetic recording. In one embodiment, two or more different elapsed time values are determined between transitions of a data signal applied to a magnetic write transducer of a heat-assisted magnetic recording apparatus. The magnetic write transducer applies a magnetic field to a recording medium in response to the data signal. A laser power signal is applied to a laser that heats the recording medium while the magnetic field is applied. Two or more different power values of the laser are respectively associated with the two or more different elapsed time values. The two or more different power levels are selected to reduce differences between track widths of recorded marks having the two or more different elapsed time values. Before the data signal is between two operational transitions, an operational elapsed time between the two operational transitions is determined. When the data signal is between the two operational transitions, the laser power signal is set at a selected one of the two or more different power values in response to the operational elapsed time corresponding to one of the two or more different values of the elapsed times.

In another embodiment, transitions of a data signal applied to a magnetic write transducer of a heat-assisted magnetic recording apparatus are determined. The magnetic write transducer applies a magnetic field to a recording medium in response to the data signal. A laser power signal is applied to a laser that heats the recording medium while the magnetic field is applied. Overshoot pulses to the laser power signal. Each overshoot pulse corresponds one of the transitions of the data signal. The overshoot pulses have magnitude and duration that reduce differences between track widths of recorded marks having two or more different elapsed time values between the transitions. These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure generally relates to data storage devices that utilize magnetic storage media, e.g., magnetic disks. For example, a hard disk drive (HDD) unit contains one or more magnetic disks that are written to and read from using a magnetic read/write head attached to the end of an arm that is positioned over tracks in the disk. To record data, the read/write head generates magnetic fields using a magnetic coil, the fields being directed to the magnetic disk surface via a write pole. To read data, the read/write head senses changes in magnetic field via a sensor such as a magneto-resistive stack that is held proximate to the moving disk. A disk drive typically has multiple heads, one for each disk surface.

Figure 1:
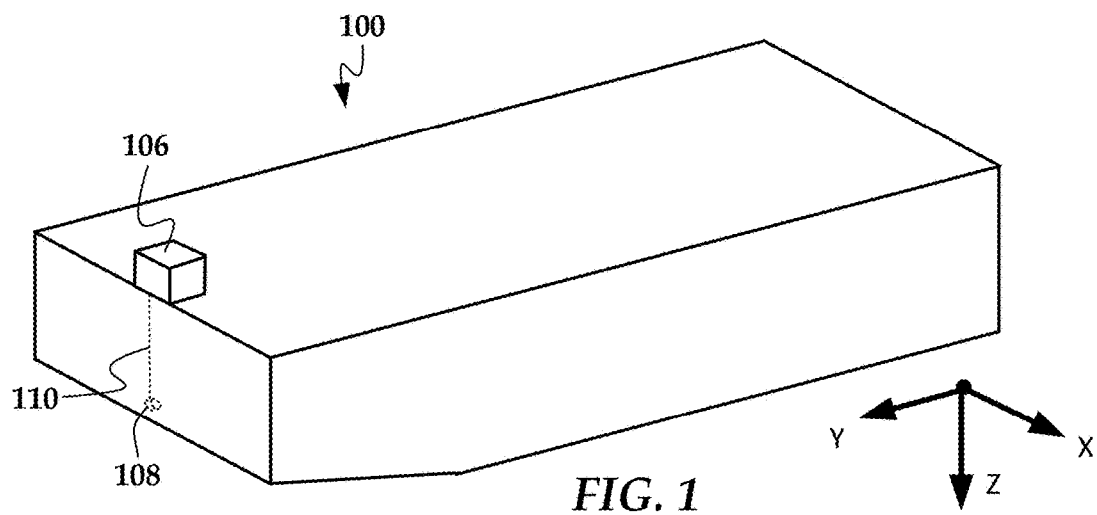
FIG. 1 is a perspective view of a slider assembly according to an example embodiment.

In order to increase ADC in magnetic storage, some drives utilize a technology known as heat-assisted magnetic recording (HAMR). In FIG. 1, a perspective view shows elements of a HAMR read/write head 100 according to an example embodiment. The read/write head 100 may be referred to herein as a recording head, write head, read head, slider, etc. Generally, a HAMR read/write head 100 includes a heat source (e.g., laser diode 106) that directs energy to a magnetic disk (not shown) via optical components (e.g., waveguide 110) integrated into the recording head. The energy creates a hotspot on the disk, lowering its magnetic coercivity and allowing a write pole (which is part of read/write transducer 108) to set magnetic orientation at the hotspot. Because of the small size of the hotspot, this allows for recording smaller bits than is currently possible with conventional perpendicular magnetic recording (PMR).

This disclosure describes a laser power modulation scheme for HAMR devices in which the laser power is modulated based on the pattern of bits recorded by the magnetic writer. This allows, for example, making the track width substantially equal for marks of all lengths. This improves the quality of the recorded short marks, and will enable gains in either linear density, track density, or both.

Figure 2:
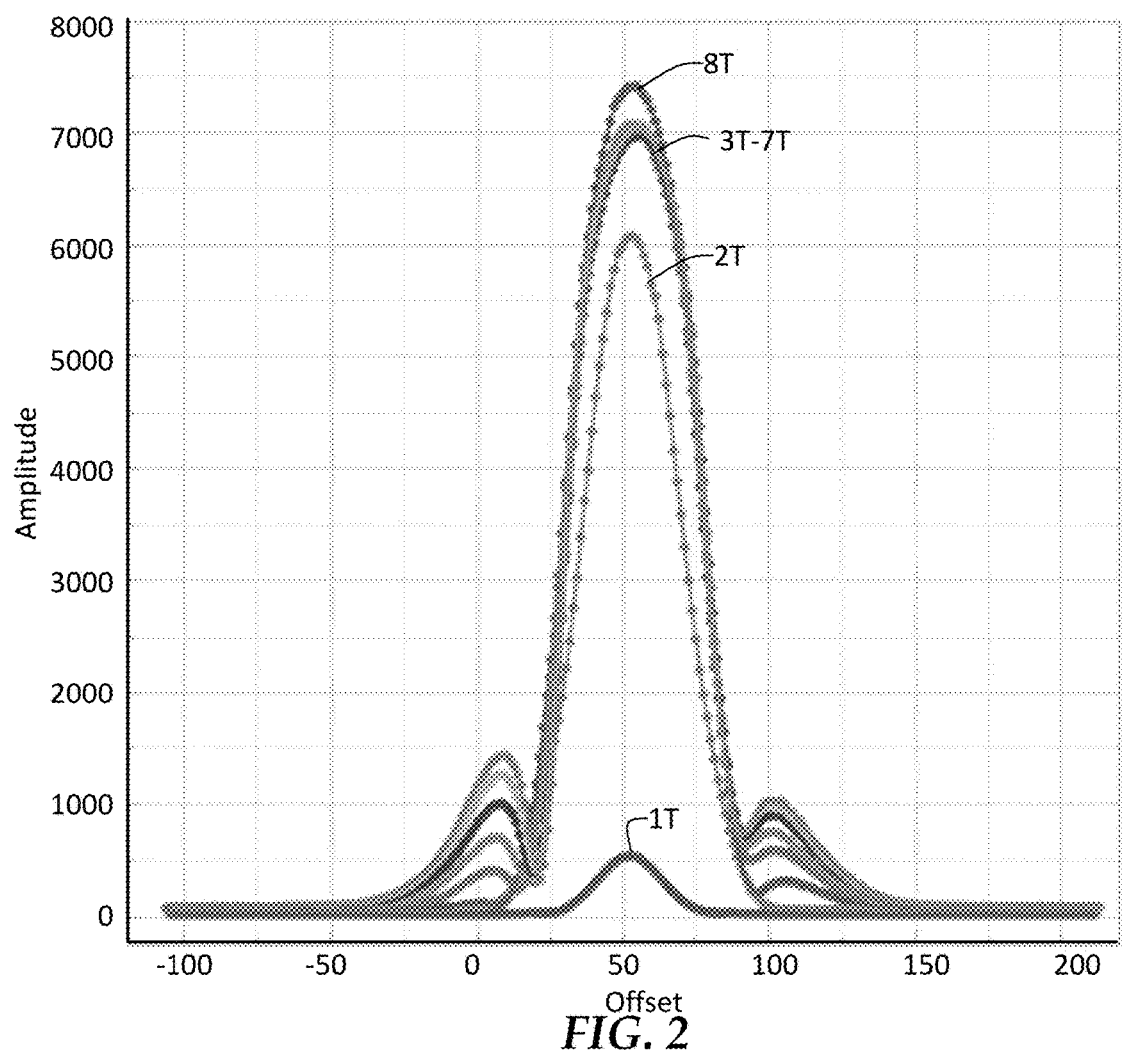
FIG. 2 is a graph showing track width for various clock timings used in recording data according to an example embodiment.

In conventional HAMR, the laser power remains constant for the duration of a sector. The result is that short marks (e.g., 1T and 2T) are narrower in the cross track direction than longer marks (e.g., ≥3T), which degrades the signal-to-noise ratio (SNR) associated with the bits recorded in shorter marks. In FIG. 2, a graph illustrates this by showing track scans for various frequencies. The track scans for the 1T and 2T tones are significantly narrower than the lower frequency counterparts (e.g., 3T-8T). Alternatively, if the laser power is selected such that the short marks have adequate SNR, then the long marks are wider than necessary, which degrades the tracks per inch capability (TPIC). In embodiments described below, apparatuses and methods can ensure the track width and recording quality of all bits are substantially the same regardless of mark length.

The track width in HAMR is known to vary with the laser power used during recording. Consequently, the laser power can be adjusted to reduce track width differences and/or SNR differences for different mark lengths. This can be achieved by modulating the laser coherently with the magnetic writer data, e.g., with a pattern based on the mark lengths of the data being recorded by the magnetic writer.

Laser modulation can be accomplished by including in the preamp a laser modulation waveform generator that is added to the nominal laser current. The modulation waveform can be generated by looking at the upcoming bits about to be written to determine the mark length and then adjusting the laser current accordingly. There are several possible embodiments for laser modulation, which are described in more detail below.

Figure 3:
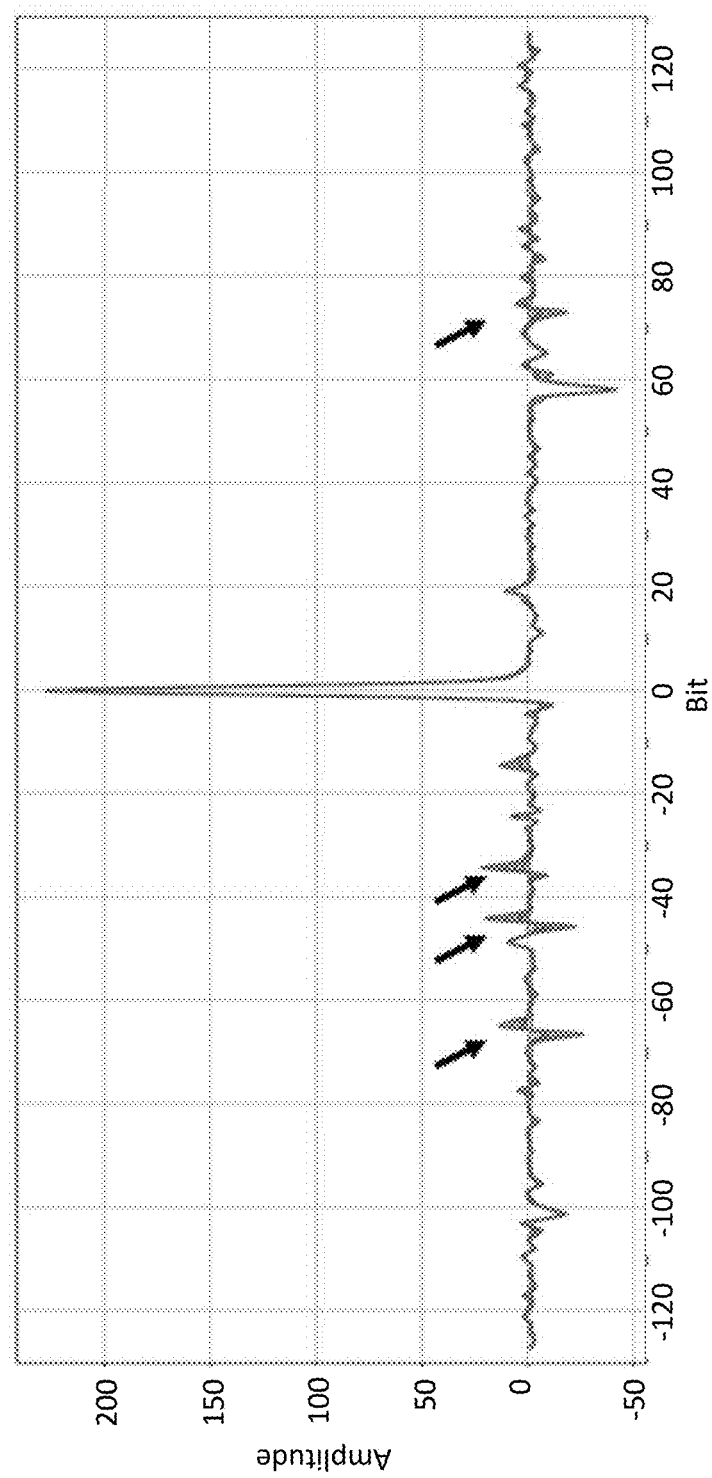
FIG. 3 is a graph of dibit response in a data storage device according to an example embodiment.

In implementing this proposed solution, several factors are considered to ensure the data is recorded accurately. First, since changing the laser power moves the recording location in the down track direction, an additional calculation can be done to cancel this shift. The timing shift required for this correction, which is added onto any existing form of precompensation, is given by $\delta t=((T_w-T_a)(\delta P/P))/(vdT/dx)$, where $T_w$ is the write temperature, $T_a$ is the ambient temperature, $\delta P/P$ is the fractional change in laser power, v is the linear velocity, and dT/dx is the down track thermal gradient. The formula itself may be derived from that used to experimentally characterize the thermal gradient in HAMR. For example, see H. J. Richter et al., *IEEE Trans. Magn.* 49, 5378 (2013), D. A. Saunders et al., *IEEE Trans. Magn.* 53, 3100305 (2017), I. Gilbert et al., *IEEE Trans. Magn.* 55, 3001006 (2019), and commonly-owned U.S. Pat. No. 10,339,963. Note that the timing shifts produced by the pattern-dependent variations in the laser power produce specific echoes in the dibit response, as shown by the arrows in FIG. 3. The dibit responses in FIG. 3 were extracted from pseudo-random bit sequences recorded with a variety of laser modulation schemes. These echoes can be characterized and used to verify the appropriate level of timing compensation required.

Figure 4:
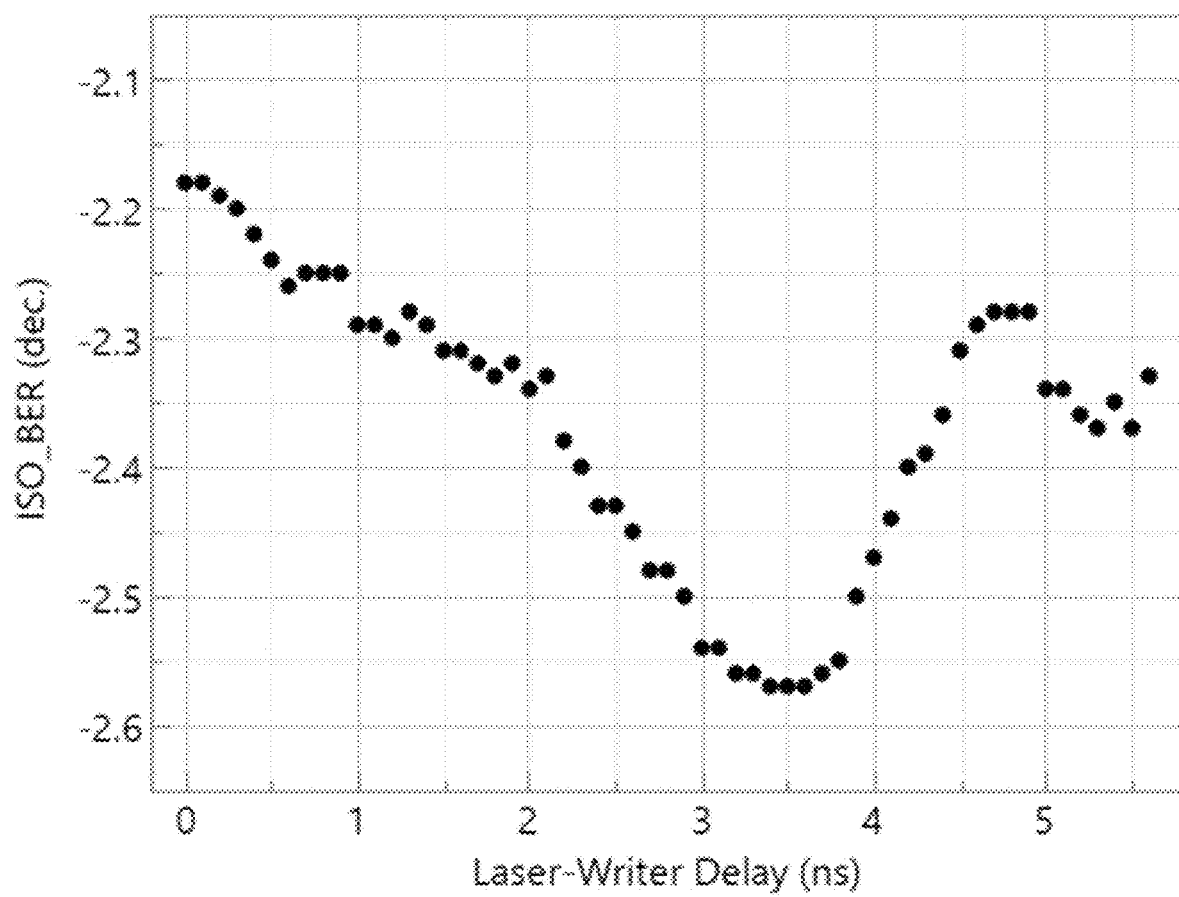
FIG. 4 is a graph illustrating the determination of writer-to-laser delay in a data storage device according to an example embodiment.

In order to ensure that magnetic writer waveform and the laser current waveform can be accurately and precisely aligned in time, the preamp may include a variable delay element in the circuitry producing these waveforms. One example method for measuring the correct writer-laser delay is to sweep the delay and measure the resulting bit error rate (BER), as shown in FIG. 4, where bit error rate is plotted as a function of time delay between the magnetic writer and the laser modulation.

In addition to the corrections for laser current change-induced shifts and the timing delay described above, it may be beneficial to introduce small additional delays to improve the fidelity of the timing of the recording or the quality of the transitions. For example, the individual magnetic transitions may be delayed such that they always occur when the laser current is elevated, which produces a higher down track thermal gradient and consequently better linear density, or bits per inch capability (BPIC). In addition, because the magnetic recording media's temperature may respond to variations in the laser current on time scales less than a single bit, it may be beneficial to deliberately tune the media properties to allow for rapid thermal response.

Figure 5A:
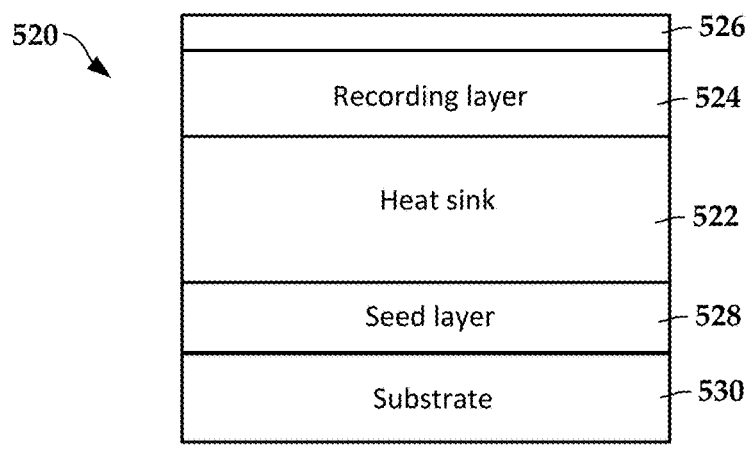
FIG. 5A is a diagram of a recording medium according to an example embodiment and FIG. 5B is a graph showing a writer data signal and a modulated laser power signal according to an example embodiment.

One non-limiting example of a recording medium 520 tuned for rapid thermal response is shown in FIG. 5A. The magnetic recording medium 520 includes a metal heatsink film 522. The heatsink film 522 may have a crystalline structure, such as body-centered-cubic (bcc) formed of materials including but not limited to Cr, Mo, W and alloys thereof. The heatsink film may have a face-centered-cubic structure including but not limited to Cu, Ag, Au and alloys thereof. The thickness of the heatsink layer 522 is matched to the dimensions of the near-field-transducer in the recording head. The thickness can be adjusted so the product of thermal conductivity and thickness gives the desired time response (and total laser power requirement). In one embodiment, the range of heatsink layer thickness is 20-50 nm. Further details of recording media heatsinks may be found in commonly owned U.S. Pat. Nos. 8,765,273 and 9,502,065.

The heatsink film 522 may be deposited on a seed layer 528 which covers a glass substrate 530. A magnetic recording layer 524 (e.g., CoPt) is deposited on the alloy heatsink layer 522. The magnetic orientation within the recording layer 524 stores the bits recorded to the recording medium 520. A protective overcoat 526 covers the magnetic recording layer 524. The heat sink layer 522 should be of sufficient thickness to conduct all the heat deposited by the recording head's near field transducer. Additionally, the heat sink layer 522 should be fabricated from a material with the maximum possible thermal conductivity. Ideally the insertion and tuning of the heat sink layer 522 should have minimal impact on the thermal, optical, and magnetic properties of the other materials above it in the media stack.

Figure 5B:
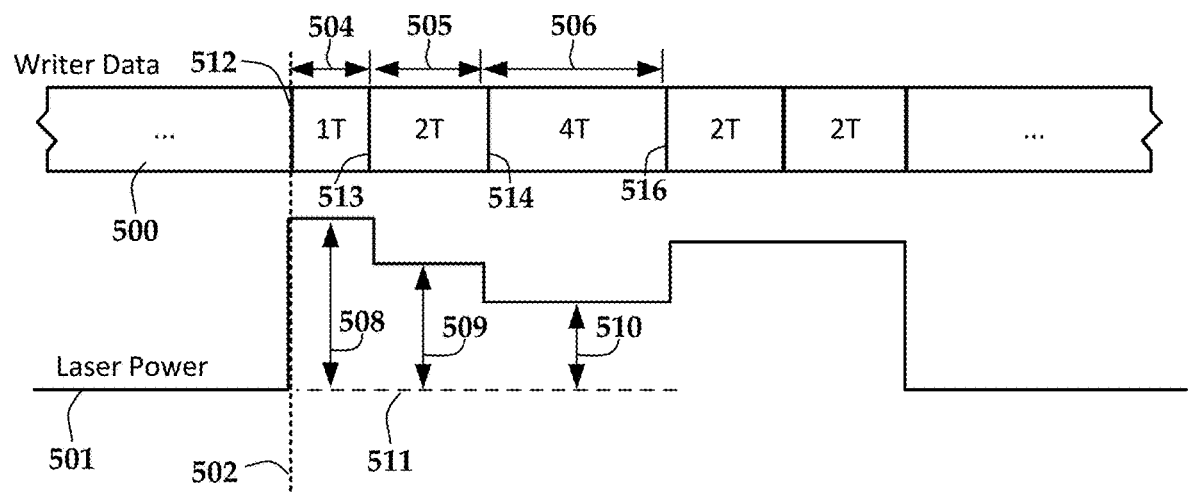

An example of writer and laser data 500, 501 usable in a HAMR drive are shown in the diagram of FIG. 5B. Dotted line 502 represents a time reference from which both data 500, 501 may be synced as described above, e.g., at the beginning of a write sequence. In some embodiments described below, a HAMR drive determines at least two different elapsed time values 504-506 between transitions of the write data 500 that drives a write transducer. The laser power signal 501 is applied to a laser that heats the recording medium while the changing magnetic field that produces data 500 is applied by the write transducer.

Two or more different power laser values 508-510 are associated with the two or more different elapsed time values, e.g., to reduce differences between track widths of recorded marks having the two or more different elapsed time values 504-506. Note that for this and other figures herein, the terms "marks" and "recorded marks" refer to data regions recorded to the medium at any period between two transitions 512-516 of the write data 500. In this example, the power levels 508-510 are measured relative to a level 511 that corresponds to the laser being turned off or idle. This level 511 could correspond to zero current, or to a non-zero current close to a bias threshold of the laser, e.g., just before significant lasing occurs.

While the write data 500 is between transitions 512-516, the laser power signal 501 to is set to one of the different power values 508-510 in response to the transitions being separated by the respective two or more different values of the elapsed times. Generally, the power values 508-510 are set to a highest power value for a shortest of the elapsed times 504-506 and to a lowest power value for a longest of the elapsed times 504-506. Intermediate values of power between the highest and lowest powers are associated with intermediate elapsed time between the shortest and longest times as appropriate, e.g., distributed linearly or according to some other function. Various ways of determining and setting the power values 508-510 are described below, as are alternate embodiments where modulating the laser power signal does not rely on determining the elapsed times 504-506 between transitions 512-516.

The laser modulation and writer waveforms may be generated externally (e.g., in the lab) using a computer and/or an arbitrary waveform generator (AWG). For applications to HAMR drives, both waveforms may be generated internally using circuitry incorporated into the preamp IC. In the drive, a source such as the system clock may be used to generate the appropriate waveform shown here being generated by AWG 600. In either case the circuits may include a high bandwidth (e.g., 7 GHz) laser amplifier to increase the amplitude of the laser modulation waveform to the correct level.

Figure 6A:
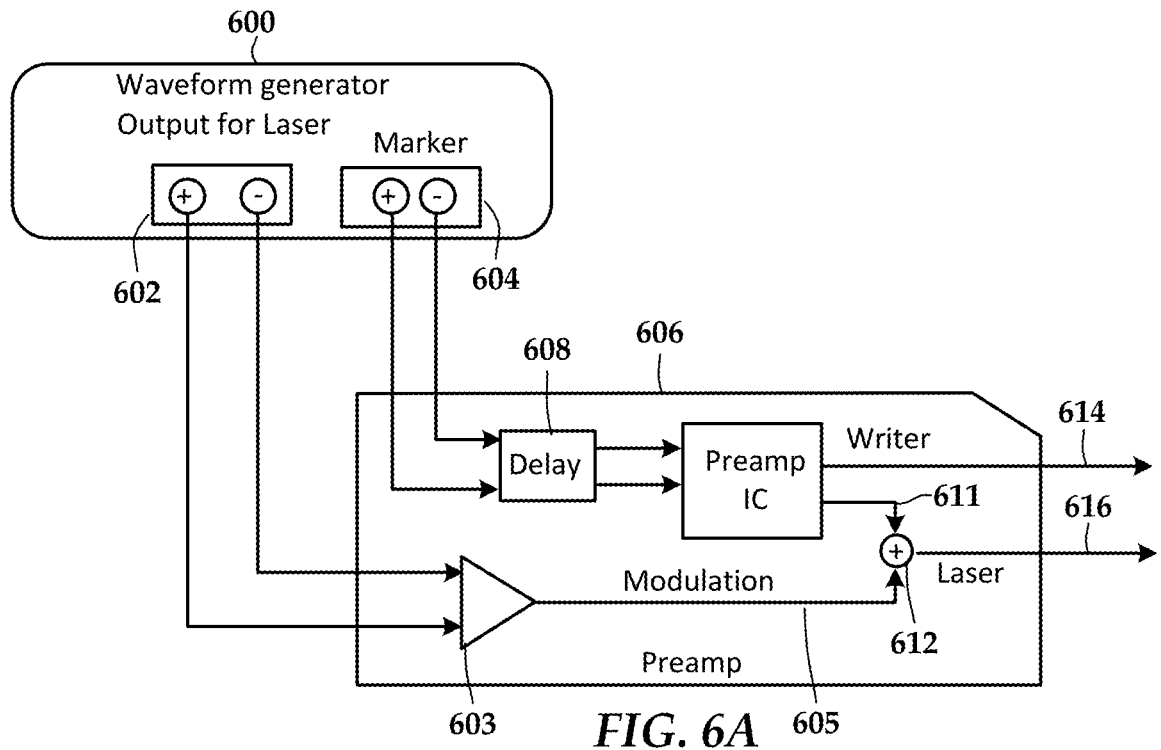
FIGS. 6A and 6B are a schematic diagrams of laser waveform generators according to example embodiments.

In FIG. 6A, a schematic diagram shows a waveform generator circuit according to an example embodiment. A waveform generator 600 outputs two signals 602, 604 for use in driving a laser via a preamplifier 606. In a HAMR drive, a source such as the system clock may be used to generate the waveforms shown here being generated by waveform generator 600. Signal 602 is a laser modulation signal that is amplified by a high speed laser driver 603. The amplified modulation signal 605 is used to generate a laser input signal 616. The signal 604 provided from the waveform generator 600 is used to generate a write signal 614 sent to a write coil. A delay element 608 can adjustably delay the transitions of the signal 604 to ensure synchronization of the modulated laser output signal 616 with the write transducer signal. The preamplifier 606 may be a high-bandwidth amplifier as noted above.

Figure 6B:
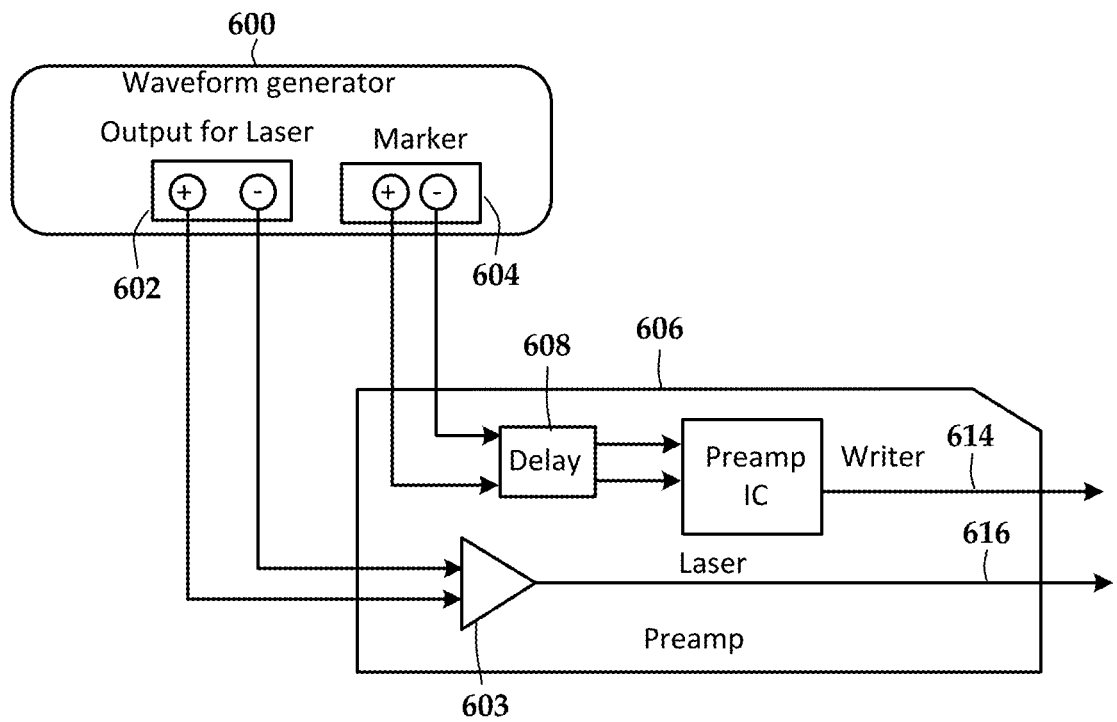

In FIG. 6A, the write signal 604 is used to extract a base current 611 that is combined 612 with the laser modulation signal 602 to produce the laser input signal 616. In FIG. 6B, a schematic diagram shows a waveform generator circuit according to an example embodiment. In FIG. 6B, the write signal path is shown using the same reference numbers as in FIG. 6A, although the individual components and signals may be configured differently. In FIG. 6B, the laser modulation output 602 is amplified to provide the laser input 616 without any combination with the writer signal 604. In the embodiment of FIG. 6B, the waveguide generator 600 will provide a more complex waveform shape that results in the laser input 616 having the base current offsets 611 that were added via the write signal 604 in the embodiment of FIG. 6A.

The nominal laser power value as well as the pulse values may be found in a number of different ways as described below. In FIGS. 7-10, writer data and laser current signals are shown superimposed over the same time line, showing the determination of laser power levels according to example embodiments. Note that in these figures laser current is used to represent a time-varying amount of power applied to the laser, however it will be understood that other signal values (e.g., voltage) may also be used to similarly represent the control of laser power without deviating from the scope of these embodiments.

Figure 7:
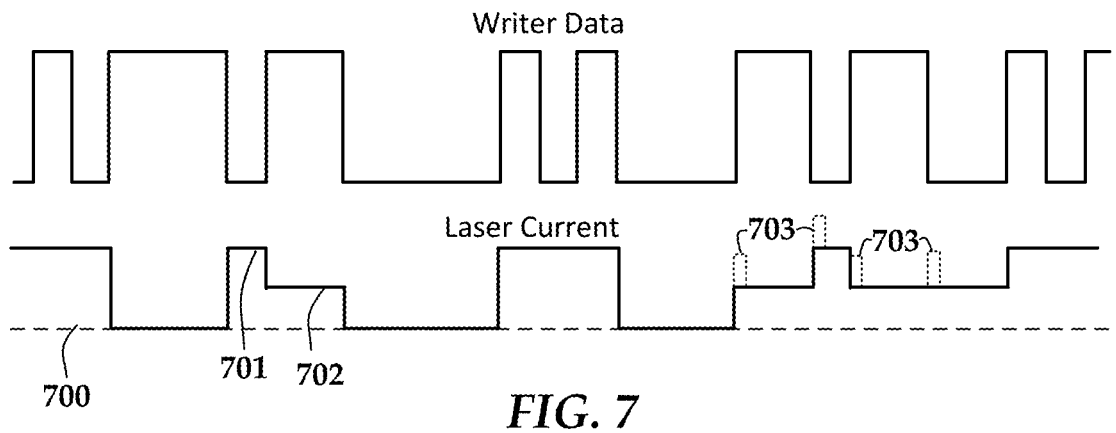
FIG. 7-10 are signal diagrams illustrating laser modulation schemes according to example embodiments.

In FIG. 7, a diagram shows a modulated laser power waveform according to an example embodiment. In this embodiment, a nominal laser power 700 is selected such that with no modulation of the laser power, the longest bits/marks have the desired track width. The longest bits/marks correspond to the longest elapsed time between adjacent two transitions of the writer data signal. The laser power for the short marks (a non-restrictive example being the 1T and 2T marks) is increased (e.g., as indicated, for example, by local high levels 701, 702) until these marks also have the desired track width.

Note that this modulation scheme takes all of its areal density capability (ADC) gains in BPIC. The level of laser power modulation will vary depending on the length of the short mark, e.g., 20% for the 1T marks and 10% for the 2T marks. The level of laser modulation may be determined on a finer time scale than this if precompensation is being used. For example, for certain precompensation settings, the penultimate bit in the NRZ sequence 1101 may have a different length than that in the sequence 0101. In this case, the level of laser modulation may be determined by the actual physical length of the mark in question rather than by the number of bits it encodes. Also note that overshoot pulses 703 may be optionally applied to the laser power inputs, where each overshoot pulse 703 corresponds to a transition of the writer data signal. These pulses 703 are described in greater detail in the discussion of FIG. 10 below.

Figure 8:
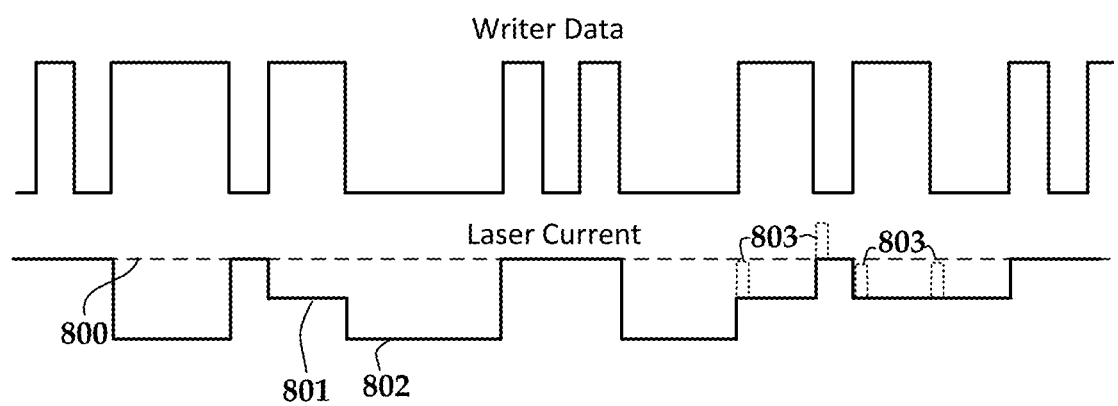

In FIG. 8, a diagram shows a modulated laser power waveform according to an example embodiment. In this embodiment, a nominal laser power 800 is selected such that with no modulation of the laser power, the shortest marks (e.g., the 1T marks) have the desired track width. Then the laser power for the longer marks (a non-restrictive example being 2T and ≥3T marks) is decreased (e.g., as indicated, for example, by local low power levels 801, 802) until these marks also have the desired track width. Note that this modulation scheme takes all of its ADC gains in TPIC. As in the embodiment in FIG. 7, the levels of laser modulation may be more finely tuned based on changes to the bit length induced by precompensation. Also note that overshoot pulses 803 may be optionally applied to the laser power inputs, where each pulse 803 corresponds to a transition of the writer data signal. These pulses 803 are described in greater detail in the discussion of FIG. 10 below.

Figure 9:
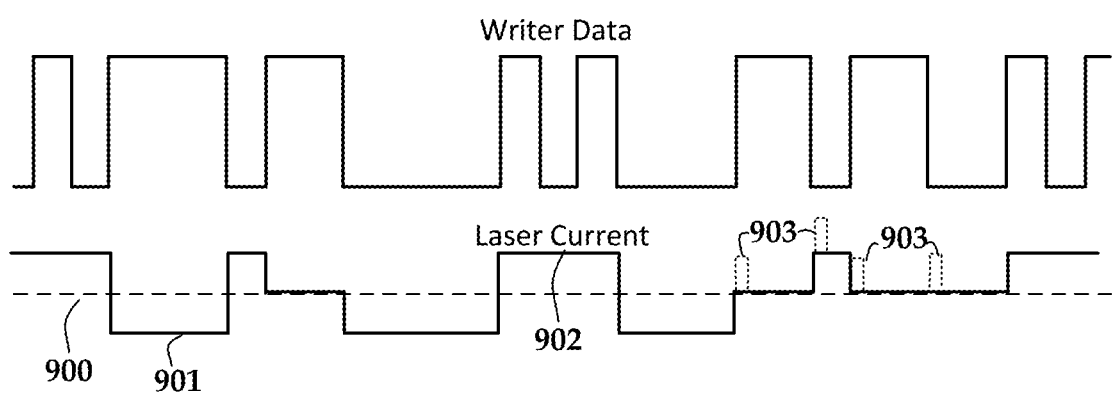

In FIG. 9, a diagram shows a modulated laser power waveform according to an example embodiment. In this embodiment, the nominal laser power 900 is selected at an intermediate value between that used in embodiments shown in FIGS. 7 and 8. This may be done by averaging the nominal laser powers from embodiments shown in FIGS. 7 and 8 or some other method, e.g., optimizing for overall SNR or BER. Then the laser power is increased (as indicated, for example, by local high power level 902) for the short marks (e.g., 1T and 2T) and decreased (as indicated, for example, by local low power level 901) for the long marks (e.g., ≥4T) until the SNR or BER is further optimized.

Note that this modulation scheme may take some of its ADC gain in BPIC and some in TPIC. A As in the embodiment in FIG. 7, the levels of laser modulation may be more finely tuned based on changes to the bit length induced by precompensation. Another equivalent method to generate the laser modulation waveforms for this case is to increase the laser power for the short marks only and not decrease the laser power for the long marks, and then AC couple this waveform to the nominal laser current. Also note that overshoot pulses 903 may be optionally applied to the laser power inputs, where each pulse 903 corresponds to a transition of the writer data signal. These pulses 903 are described in greater detail in the discussion of FIG. 10 below.

Figure 10:
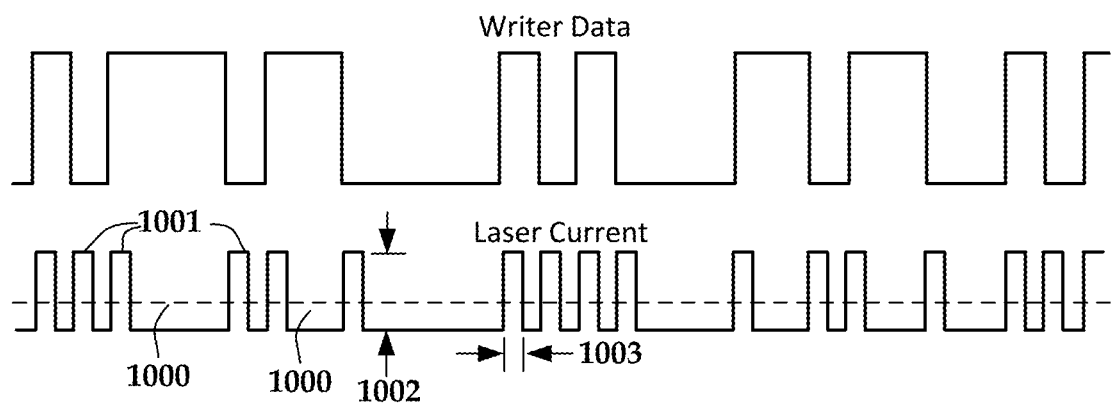

In FIG. 10, a diagram shows modulated laser power waveforms according to an example embodiment. In this embodiment, an overshoot pulse 1001 is applied to the laser power every time a transition is passed. This overshoot pulse 1001 may be of constant amplitude and duration for every transition, or it may vary based on the number of bits in the mark or on the physical length of the mark (which also corresponds to elapsed times between the write data signal). This overshoot may be applied to relative to constant nominal laser current 1000, or it may be applied on top of the laser current modulations described in embodiments shown in FIGS. 7-9 (see pulses 703, 803, and 903 in FIGS. 7-9).

Because the laser current for the short marks (e.g., 1T and 2T marks) is equal to the nominal laser current plus the overshoot for most of the length of the mark, whereas the laser current for the long marks (e.g., ≥3T marks) is equal to only the nominal laser current for most of the length of the mark, the net effect is similar to the laser current modulation schemes of embodiments shown in FIGS. 7-9. The embodiment in FIG. 10 has an additional benefit, however, of equalizing the track width for the entire length of a long mark, rather than having the first few bits narrow and the rest wide, as may be the case for the embodiments shown in FIGS. 7-9.

Because the laser current/power signal in FIG. 10 also varies both above and below the nominal value similar to the embodiment shown in FIG. 9, the nominal value 1000 may be determined similarly as described in the embodiment shown in FIG. 9. Note that in this case, the offset/magnitude 1002 and duration 1003 of the overshoot may be taken into account when determining the nominal value 1000, e.g., by assuming an a priori distribution of overshoot pulses as well as their magnitude 1002 and duration 1003. Alternatively, a nominal value 1000 may be first derived, and then the magnitude 1002 and duration 1003 may be adjusted until some criteria is met, e.g., minimizing BER, dibit response, etc.

Figure 11:
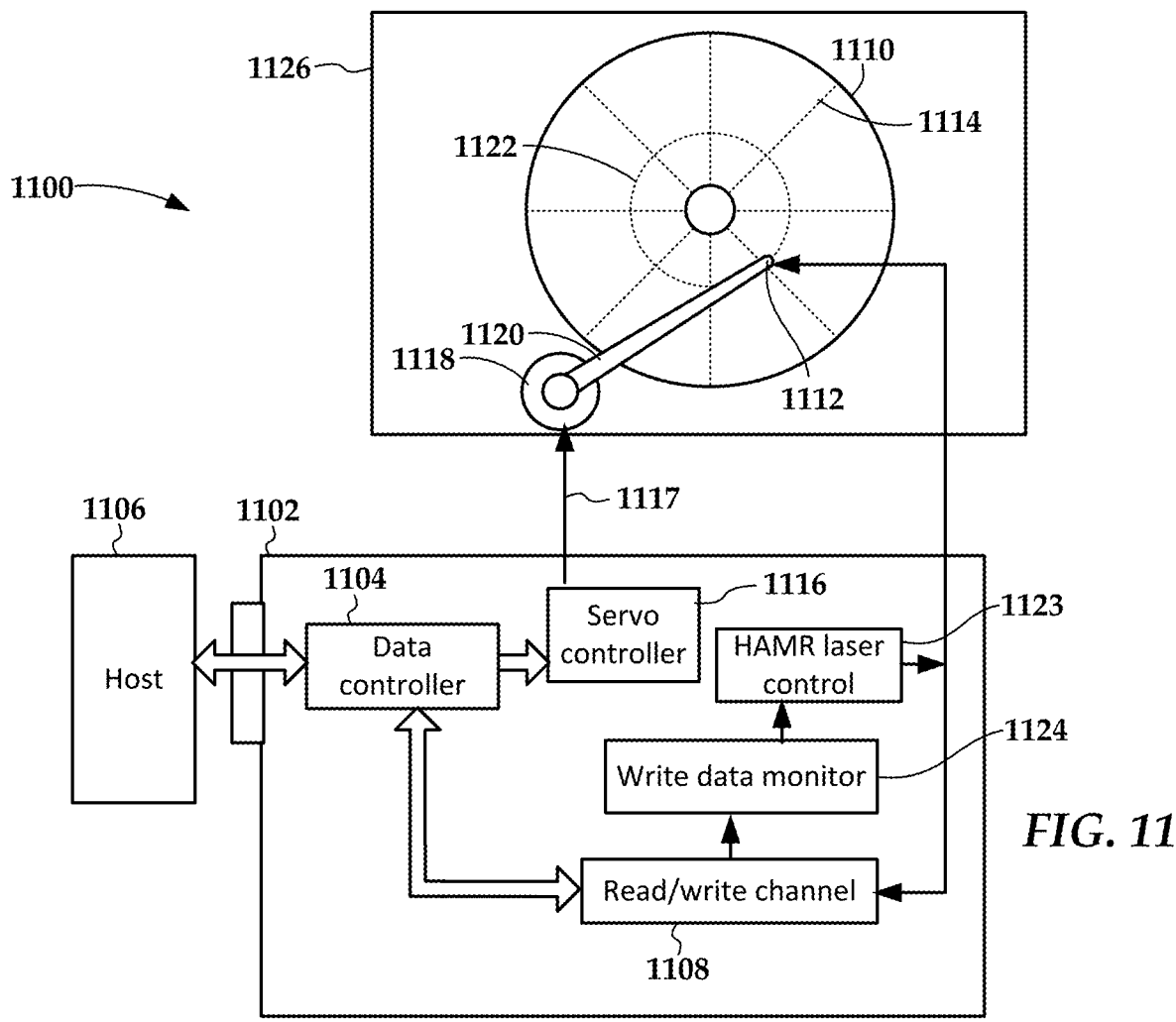
FIG. 11 is a diagram of an apparatus according to an example embodiment.

In FIG. 11, a block diagram illustrates a data storage apparatus 1100 according to an example embodiment. Control logic circuit 1102 of the apparatus 1100 includes a system controller 1104 that processes read and write commands and associated data from a host device 1106. The host device 1106 may include any electronic device that can be communicatively coupled to store and retrieve data from a data storage device, e.g., a computer, peripheral card, etc. The system controller 1104 is coupled to a read/write channel 1108 that reads from and writes to a surface of a magnetic disk 1110.

The read/write channel 1108 generally converts data between the digital signals processed by the controller 1104 and the analog signals conducted through one or more read/write heads 1112 during read operations. To facilitate the read operations, the read/write channel 1108 may include analog and digital interface circuitry such as preamplifiers, filters, decoders, digital-to-analog converters, timing-correction units, etc. The read/write channel 1108 also provides servo data read from servo wedges 1114 on the magnetic disk 1110 to a servo controller 1116. The servo controller 1116 uses these signals to provide a voice coil motor control signal 1117 to a VCM 1118. The VCM 1118 moves (e.g., rotates) an arm 1120 upon which the read/write heads 1112 are mounted in response to the voice coil motor control signal 1117.

Data within the servo wedges 1114 is used to detect the location of a read/write head 1112 relative to the magnetic disk 1110. The servo controller 1116 uses servo data to move a read/write head 1112 to an addressed track 1122 and block on the magnetic disk 1110 in response to the read/write commands (seek mode). While data is being written to and/or read from the disk 1110, the servo data is also used to maintain the read/write head 1112 aligned with the track 1122 (track following mode).

The disk drive 1100 uses HAMR, and therefore the read/write heads 1112 include an energy source (e.g., laser diode) that heats the magnetic disk 1110 when recording. A HAMR laser control block 1123 sends a current to activate the lasers when recording. To assist in detecting and compensating for variations in the application of heat to the disk, a write data monitor 1124 examines write data signals targeted for the magnetic writer on the read/write head 1112. The data monitored by the write monitor 1124 may at least include transitions of the write signal as a function of time, as well as elapsed time between subsequent transitions in some embodiments. The write monitor 1124 sends data to the HAMR laser control 1123 to modulate the laser power as described in various embodiments herein.

Figure 12:
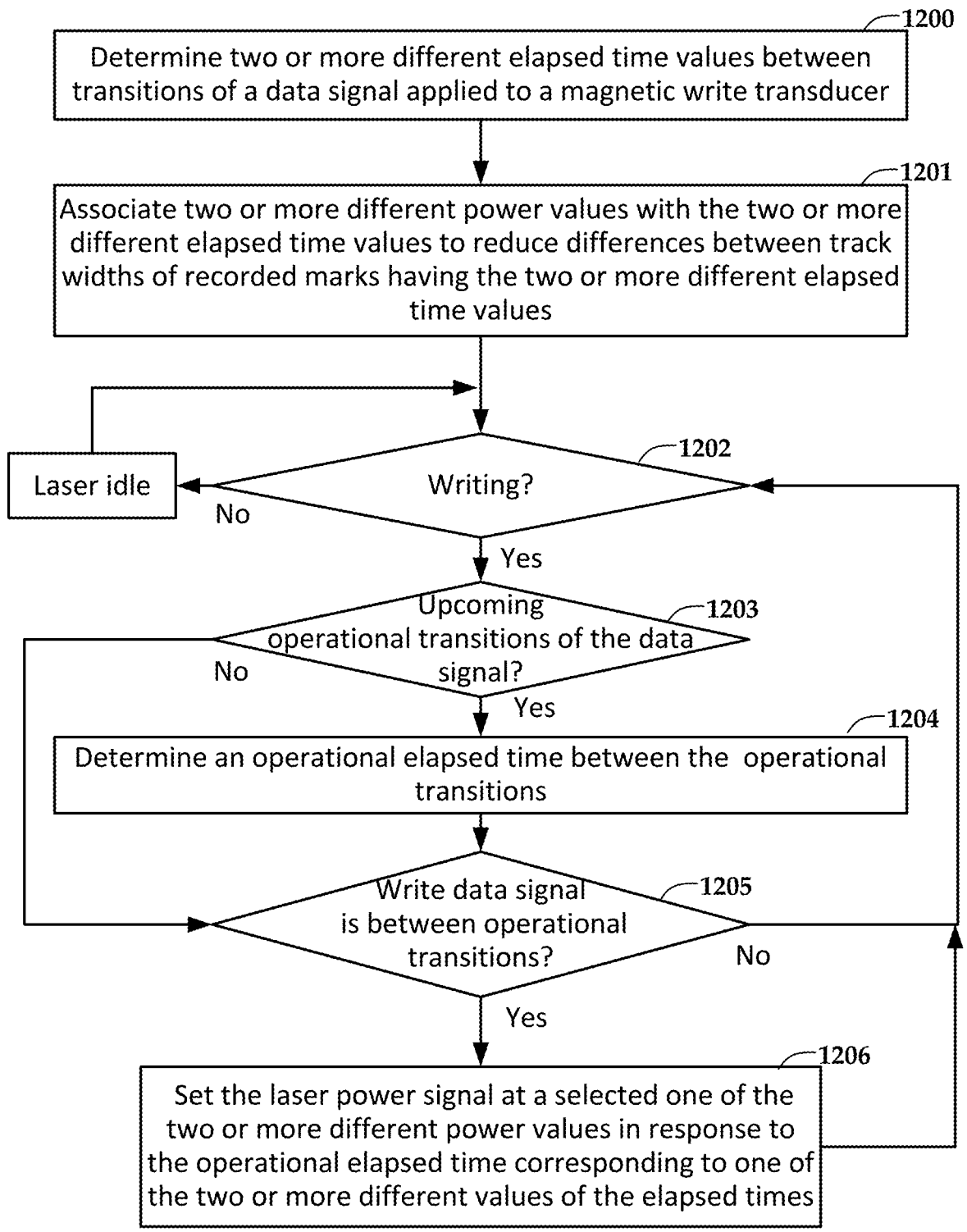
FIGS. 12-13 are flowcharts of methods according to example embodiments.

In FIG. 12, a flowchart shows a method according to an example embodiment. The method involves determining 1200 two or more different elapsed time values between transitions of a data signal applied to a magnetic write transducer of a heat-assisted magnetic recording apparatus. The magnetic write transducer applies a magnetic field to a recording medium in response to the data signal. A laser power signal (e.g., current) is applied to a laser that heats the recording medium while the magnetic field is applied. Note that for this method, the determining 1200 of the elapsed time values may involve reading values of elapsed time from a persistent memory.

Two or more different power values are associated 1201 with the two or more different elapsed time values. The two or more different power levels are selected to reduce differences between track widths of recorded marks having the two or more different elapsed time values. Again, the association 1201 of the power levels with the elapsed time values may be determined via a structure in memory, e.g., a map between elapsed time and power values.

At block 1202, it is determined if writing is occurring. If so (block 1202 returns 'yes'), it is determined whether there are upcoming two operational transitions of the data signal at block 1203. Note that while recording a sequence of marks, block 1203 will always return 'yes' until the last mark in the sequence is being written, after which the system will stop writing (block 1202 will return 'no'). Before the data signal is between the two operational transitions, an operational elapsed time between the two operational transitions determined 1204. When the data signal is between the two operational transitions (block 1205 returns 'yes'), the laser power signal is set 1206 at a selected one of the two or more different power values in response to the operational elapsed time corresponding to one of the two or more different values of the elapsed times.

Figure 13:
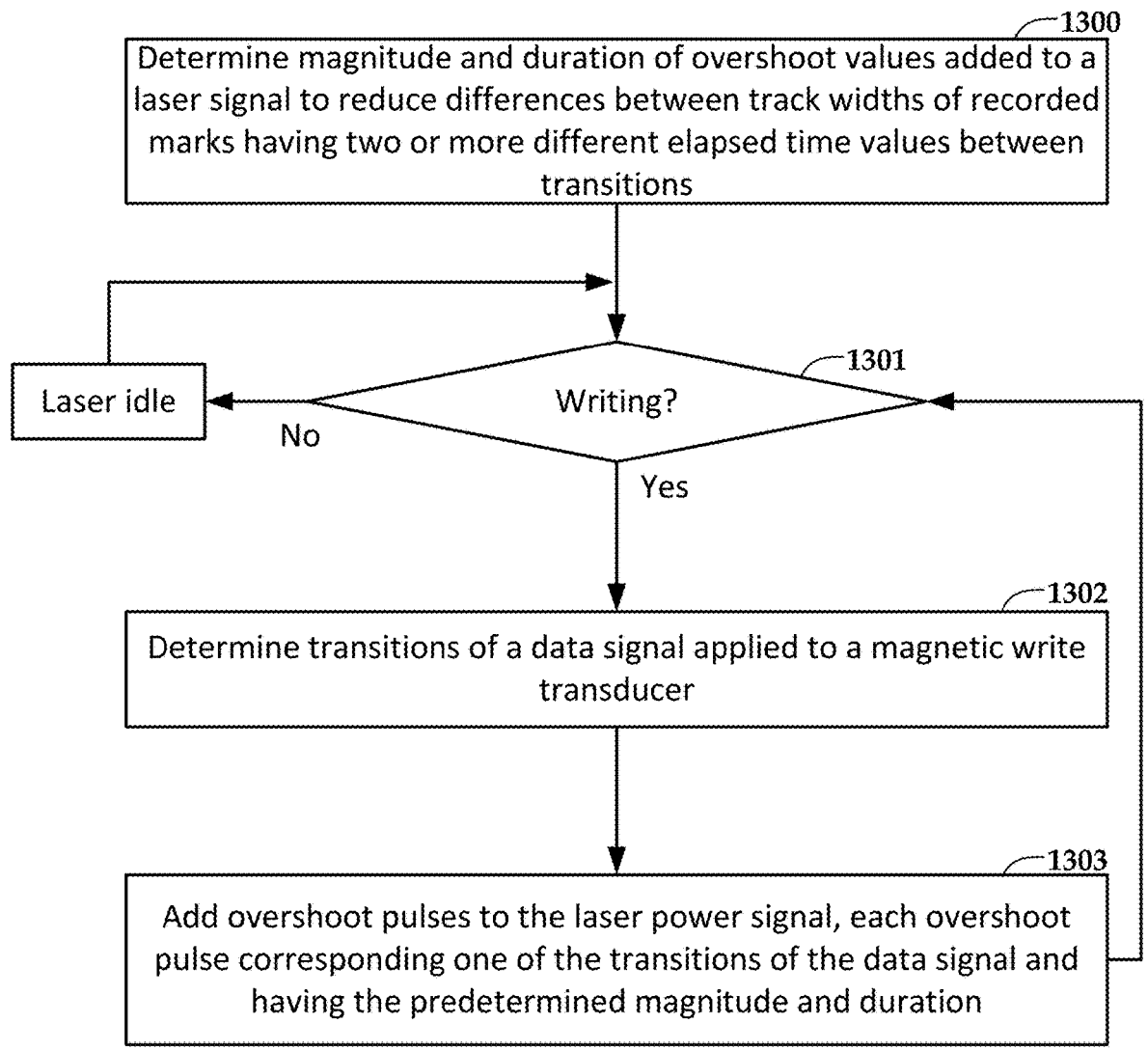

In FIG. 13, a flowchart shows a method according to another example embodiment. The method involves determining 1300 determining magnitude and duration of overshoot values added to a laser signal to reduce differences between track widths of recorded marks having two or more different elapsed time values between transitions. This determination 1300 may be made by reading values from a persistent memory. While writing (block 1301 returns 'yes'), transitions of a data signal applied to a magnetic write transducer of a heat-assisted magnetic recording apparatus are determined 1302. The magnetic write transducer apply a magnetic field to a recording medium in response to the data signal, a laser power signal being applied to a laser that heats the recording medium while the magnetic field is applied. Overshoots pulses are added 1303 to the laser power signal, each overshoot pulse corresponding one of the transitions of the data signal. The overshoot pulses have the magnitude and duration determined at block 1300.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method, comprising:
   determining two or more different elapsed time values between transitions of a data signal applied to a magnetic write transducer of a heat-assisted magnetic recording apparatus, the magnetic write transducer applying a magnetic field to a recording medium in response to the data signal, a laser power signal being applied to a laser that heats the recording medium while the magnetic field is applied;
   respectively associating two or more different power values of the laser with the two or more different elapsed time values, the two or more different power levels selected to reduce differences between track widths of recorded marks having the two or more different elapsed time values;
   before the data signal is between two operational transitions, determining an operational elapsed time between the two operational transitions; and
   when the data signal is between the two operational transitions, setting the laser power signal at a selected one of the two or more different power values in response to the operational elapsed time corresponding to one of the two or more different values of the elapsed times.

2. The method of claim 1, wherein the laser power signal is offset from the data signal by a delay, the delay selected by:
   sweeping the delay from a first value to a second value while recording test data to the recording medium;
   reading bit error rate of the test data; and
   selecting a value of the delay that results in a minimum value of the bit error rate.

3. The method of claim 1, further comprising:
   defining a nominal power value of two or more different power values such that recorded marks with a longest of the two or more elapsed time values have a target track width at the nominal power value; and
   defining a second power value of the two or more different power values such that recorded marks with a shortest of the two or more elapsed time values has the target track width at the second power value, the second power value being higher than the nominal power value.

4. The method of claim 3, further comprising defining a third power value of the two or more different power values that is between the nominal power value and the second power value, the third value associated with an intermediate elapsed time between the shortest and the longest elapsed times.

5. The method of claim 1, further comprising:
   defining a nominal power value of two or more different power values such that recorded marks with a shortest of the two or more elapsed time values have a target track width at the nominal power value; and
   defining a second power value of the two or more different power values such that recorded marks with a longest of the two or more elapsed time values have the target track width at the second power value, the second power value being lower than the nominal power value.

6. The method of claim 1, further comprising:
   defining a nominal power value of two or more different power values such that recorded marks with an elapsed time between a longest and shortest of the two or more elapsed time values has a target track width at the nominal power value; and
   defining second and third power values of the two or more different power values respectively associated with the longest and shortest of the two or more elapsed time values such that recorded marks with the longest and shortest of the two or more elapsed time values have the target track width at the second and third power values, the s second and third power values value being respectively lower and higher than the nominal power value.

7. The method of claim 1, further comprising adding an overshoot to the laser power signal for each of the transitions of a data signal.

8. The method of claim 1, further comprising heat sinking a recording layer of the recording medium via a heat sink layer located below the recording layer, the heat sinking of the recording layer increasing a thermal response of the recording medium.

9. A heat-assisted magnetic recording apparatus comprising:
   interface circuitry operable to communicate with a magnetic write transducer and a laser, the laser heating a recording medium in response to a laser power signal while the magnetic field is applied to the recording medium;
   a controller coupled to the interface circuitry and configured to:
   determine two or more different elapsed time values between transitions of a data signal applied to the magnetic write transducer;
   respectively associate two or more different power values of the laser with the two or more different elapsed time values, the two or more different power levels selected to reduce differences between track widths of recorded marks having the two or more different elapsed time values;
   before the data signal is between two operational transitions, determine an operational elapsed time between the two operational transitions; and
   when the data signal is between the two operational transitions, set the laser power signal at a selected one of the two or more different power values in response to the operational elapsed time corresponding to one of the two or more different values of the elapsed times.

10. The apparatus of claim 9, wherein the laser power signal is offset from the data signal by a delay, the delay selected by:
    sweeping the delay from a first value to a second value while recording test data to the recording medium;
    reading bit error rate of the test data; and
    selecting a value of the delay that results in a minimum value of the bit error rate.

11. The apparatus of claim 9, wherein the controller is further configured to:
    define a nominal power value of two or more different power values such that recorded marks with a longest of the two or more elapsed time values have a target track width at the nominal power value; and
    define a second power value of the two or more different power values such that recorded marks with a shortest of the two or more elapsed time values has the target track width at the second power value, the second power value being higher than the nominal power value.

12. The apparatus of claim 11, wherein the controller is further configured to define a third power value of the two or more different power values that is between the nominal power value and the second power value, the third value associated with an intermediate elapsed time between the shortest and the longest elapsed times.

13. The apparatus of claim 9, wherein the controller is further configured to:
- define a nominal power value of two or more different power values such that recorded marks with a shortest of the two or more elapsed time values have a target track width at the nominal power value; and
- define a second power value of the two or more different power values such that recorded marks with a longest of the two or more elapsed time values have the target track width at the second power value, the second power value being lower than the nominal power value.

14. The apparatus of claim 9, wherein the controller is further configured to:
- define a nominal power value of two or more different power values such that recorded marks with an elapsed time between a longest and shortest of the two or more elapsed time values has a target track width at the nominal power value; and
- define second and third power values of the two or more different power values respectively associated with the longest and shortest of the two or more elapsed time values such that recorded marks with the longest and shortest of the two or more elapsed time values have the target track width at the second and third power values, the s second and third power values value being respectively lower and higher than the nominal power value.

15. The apparatus of claim 9, further comprising adding an overshoot to the laser power signal for each of the transitions of a data signal.

16. The apparatus of claim 9, further comprising the recording medium, wherein a recording layer of the recording medium is formed on a heat sink layer, the heat sink layer increasing a thermal response of the recording medium.

17. A method, comprising:
- determining transitions of a data signal applied to a magnetic write transducer of a heat-assisted magnetic recording apparatus, the magnetic write transducer applying a magnetic field to a recording medium in response to the data signal, a laser power signal being applied to a laser that heats the recording medium while the magnetic field is applied; and
- adding overshoot pulses to the laser power signal, each overshoot pulse corresponding one of the transitions of the data signal, the overshoot pulses having magnitude and duration that reduce differences between track widths of recorded marks having two or more different elapsed time values between the transitions.

18. The method of claim 17, wherein the laser power signal is offset from the data signal by a delay, the delay selected by:
- sweeping the delay from a first value to a second value while recording test data to the recording medium;
- reading bit error rate of the test data; and
- selecting a value of the delay that results in a minimum value of the bit error rate.

19. The method of claim 17, wherein the magnitude and duration are the same for all of the transitions.

20. The method of claim 17, wherein the magnitude and duration vary for different transitions based on at least one of a number of bits in the recorded mark or on a physical length of the recorded mark.

* * * * *